United States Patent
Kim et al.

(10) Patent No.: US 9,238,723 B2
(45) Date of Patent: Jan. 19, 2016

(54) MELT DEVOLATILIZATION EXTRUSION PROCESS

(75) Inventors: Eung K. Kim, Midland, MI (US); Daniel A. Beaudoin, Midland, MI (US); Mark A. Barger, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 372 days.

(21) Appl. No.: 13/825,885

(22) PCT Filed: Oct. 12, 2011

(86) PCT No.: PCT/US2011/055856
§ 371 (c)(1),
(2), (4) Date: Mar. 25, 2013

(87) PCT Pub. No.: WO2012/058002
PCT Pub. Date: May 3, 2012

(65) Prior Publication Data
US 2013/0285271 A1   Oct. 31, 2013

Related U.S. Application Data

(60) Provisional application No. 61/407,946, filed on Oct. 29, 2010.

(51) Int. Cl.
| | | |
|---|---|---|
| *B29C 47/76* | (2006.01) | |
| *C08J 9/228* | (2006.01) | |
| *B29C 47/92* | (2006.01) | |
| *B29C 44/34* | (2006.01) | |
| *B29C 44/50* | (2006.01) | |
| *C08L 53/02* | (2006.01) | |
| *B29K 7/00* | (2006.01) | |
| *B29K 9/06* | (2006.01) | |
| *B29K 21/00* | (2006.01) | |
| *B29C 47/00* | (2006.01) | |
| *B29K 105/00* | (2006.01) | |
| *C08K 5/1515* | (2006.01) | |
| *C08K 5/527* | (2006.01) | |

(52) U.S. Cl.
CPC ............. *C08J 9/228* (2013.01); *B29C 44/3461* (2013.01); *B29C 44/50* (2013.01); *B29C 47/762* (2013.01); *B29C 47/92* (2013.01); *C08L 53/02* (2013.01); *C08L 53/025* (2013.01); *B29C 47/0004* (2013.01); *B29C 47/0009* (2013.01); *B29C 2947/92019* (2013.01); *B29C 2947/92209* (2013.01); *B29C 2947/92228* (2013.01); *B29C 2947/92361* (2013.01); *B29C 2947/92514* (2013.01); *B29C 2947/92704* (2013.01); *B29C 2947/92723* (2013.01); *B29C 2947/92914* (2013.01); *B29C 2007/00* (2013.01); *B29K 2009/06* (2013.01); *B29K 2021/00* (2013.01); *B29K 2105/0085* (2013.01); *C08K 5/1515* (2013.01); *C08K 5/527* (2013.01); *C08L 2205/02* (2013.01); *C08L 2205/03* (2013.01)

(58) Field of Classification Search
CPC .................... B29C 2947/92914; B29C 47/762
USPC ......................................................... 264/45.9
See application file for complete search history.

(56) References Cited

U.S. PATENT DOCUMENTS

| | | | |
|---|---|---|---|
| 3,799,234 A | | 3/1974 | Skidmore |
| 5,958,316 A | * | 9/1999 | Guntherberg ........... B29C 47/40 264/101 |
| 6,833,096 B2 | | 12/2004 | Wang |
| 7,211,629 B2 | | 5/2007 | Chapman |
| 7,226,989 B2 | | 6/2007 | Silvi |
| 7,419,295 B2 | | 9/2008 | Inoue |
| 7,595,367 B2 | | 9/2009 | Carrillo |
| 7,605,194 B2 | | 10/2009 | Ferencz |
| 7,605,222 B2 | | 10/2009 | Ye |
| 7,625,980 B2 | * | 12/2009 | Chung .................... B29C 47/50 525/191 |
| 2008/0015313 A1 | * | 1/2008 | Chung .................... B29C 47/50 525/192 |
| 2008/0139700 A1 | | 6/2008 | Roden |
| 2009/0043045 A1 | * | 2/2009 | Resconi ................... C08L 23/10 525/53 |
| 2009/0076214 A1 | | 3/2009 | Kiss |
| 2009/0233097 A1 | | 9/2009 | Kolich |
| 2009/0264599 A1 | | 10/2009 | Balhoff |
| 2010/0296360 A1 | * | 11/2010 | Inagawa ................... B29B 7/845 366/83 |
| 2012/0041115 A1 | * | 2/2012 | Kumar et al. ................. 524/151 |
| 2013/0217833 A1 | * | 8/2013 | Paul .......................... C08C 2/00 525/340 |
| 2014/0323644 A1 | * | 10/2014 | Kim et al. ..................... 524/525 |

FOREIGN PATENT DOCUMENTS

| | | |
|---|---|---|
| EP | 262594 A | 4/1988 |
| EP | 988957 A | 3/2000 |
| EP | 2014684 A | 1/2009 |
| WO | 95/01380 A | 1/1995 |
| WO | 2007/019120 A | 2/2007 |
| WO | 2008/008129 A | 1/2008 |
| WO | 2009/139604 A | 11/2009 |

* cited by examiner

*Primary Examiner* — Ryan Ochylski
(74) *Attorney, Agent, or Firm* — Gary C Cohn PLLC

(57) ABSTRACT

Thermally sensitive polymers containing polymerizable carbon-carbon unsaturation and/or aliphatically bound halogen are devolatilized in a devolatilizing extruder. The thermally sensitive polymer is blended with a second polymer, which does not contain polymerizable carbon-carbon unsaturation or more than 5% by weight aliphatically bound halogen, and which has a molecular weight of from 25,000 to 175,000. The blend is then devolatilized in the extruder to produce a devolatilized polymer blend. Thermal degradation of the thermally sensitive polymer is minimized in this process.

18 Claims, No Drawings

MELT DEVOLATILIZATION EXTRUSION PROCESS

This application claims priority from U.S. Provisional Patent Application No. 61/407,946, filed 29 Oct. 2010.

The present invention relates to a method for devolatilizing temperature-sensitive polymers, such as polymers that contain polymerizable unsaturation and/or aliphatically-bound halogens.

Organic polymers are commonly devolatilized as part of their ordinary manufacturing and/or purification regimen. Devolatilization removes low molecular weight compounds such as, for example, solvents, catalyst residues, un-reacted monomers, moisture, or process by-products.

A large number of devolatilization processes are used at commercial scale to remove volatile materials from a wide range of polymers that are in the form of a melt or a particulate solid. One such process, that is useful in conjunction with some thermoplastic polymers, is a melt devolatilization extrusion process. A melt devolatilization extrusion process has the potential to remove large quantities of volatiles from an organic polymer. The devolatilized product often contains only very small quantities of residual volatile materials.

The devolatilization extrusion process is performed by heating the polymer enough to allow it to flow under the conditions that exist in the extruder. The temperature is held above the boiling temperature of the volatiles that are to be removed. This extruder includes an elongated chamber (typically referred to as the "extruder barrel") that contains one or more vents and one or more rotating screws. Volatilized compounds escape from the extruder barrel through the vents as the polymer traverses along the length of the extruder barrel towards the die. The screw(s) provide the mechanical force necessary to force the heated polymer through the extruder barrel and subsequently out through the die.

One problem with devolatilization extrusion processes is that they tend to subject the polymer to high temperatures. There are mainly two sources of energy that can cause the polymer to increase in temperature during a melt devolatilization extrusion process. The first of these is conduction heat that is supplied through the extruder barrel from external heating devices. The second source of energy is mechanical energy input from the motor via the rotation of the extruder screw(s).

Production scale devolatilizing extruders typically operate in an adiabatic manner (i.e., without applying conduction heating). For this reason, the primary source of energy that can increase the temperature attained during the devolatilization extrusion operation is the mechanical energy from the extruder motor used to operate the screw(s). A portion of this energy is converted to heat as a result of inter-molecular friction within the melt. The production of heat in this way raises the temperature of the polymer melt. This is called viscous dissipation heating. Viscous dissipation heating becomes more significant as the size of extruder increases because the surface area per unit volume is smaller, and therefore less heat can escape through the extruder barrel. It is possible to minimize viscous dissipation heating by reducing the screw speed during extrusion; in this way less mechanical energy is introduced into the system, which results in less viscous dissipation heating, and operating temperatures can thereby be reduced. But that approach often is infeasible on a commercial scale. Lower screw speeds can lead to low throughputs per unit time, which makes the process too expensive to operate. The rotation of the screw is important for the further reason that it constantly renews the surface of the polymer melt, which allows more of the solvent to escape and more efficient operation. Reducing the screw rotational speed makes it more difficult to reduce the solvent level to the desired targets.

Polymers that contain polymerizable carbon-carbon unsaturation are often quite temperature-sensitive. Among these are polymers of conjugated dienes such as butadiene or cyclopentadiene. The carbon-carbon unsaturation can polymerize under the conditions encountered during the devolatilization extrusion process. This can introduce unwanted branching or ultimately crosslinking into the polymer.

Polymers that contain aliphatically bound halogen atoms also tend to be temperature sensitive, because the halogen atoms can be thermally labile. Certain polymers that contain aliphatically bound halogens can lose halogen under high temperature conditions. The halogen is usually liberated in the form of hydrogen halides (HF, HCl, HBr, etc.) or halogen gas ($F_2$, $Cl_2$, $Br_2$). These gasses are corrosive and present worker exposure issues. Another problem is that the loss of halogen and/or halogen and hydrogen can cause aliphatic carbon-carbon double bonds to form in the polymer; these double bonds can polymerize to cross-link the polymer and form gels, either during the devolatilization extrusion process itself or in a subsequent melt-processing operation. The hydrogen halides and/or halogen gas that is generated is believed to be auto-catalytic, in that the liberated halogen-containing compounds are believed to catalyze the elimination of more halogen (and usually the formation of more carbon-carbon double bonds). The possibility of this auto-catalysis makes polymers that contain aliphatically-bound halogen especially thermally sensitive.

Because devolatilization extrusion offers the possibility of inexpensively reducing the concentration of volatile compounds in an organic polymer to low levels, there is a desire to provide a way to economically process temperature-sensitive polymers by devolatilization extrusion.

This invention is such a process for producing a devolatilized polymer blend. This process of this invention comprises a) feeding a heat-plasticized polymer mixture that includes
   component 1): at least one first thermoplastic polymer containing polymerizable carbon-carbon unsaturation, at least 10% by weight of aliphatically bound halogen, or both;
   component 2): at least one second thermoplastic organic polymer, which is compatible with component 1) at the relative amounts thereof that are present, wherein the second organic polymer is substantially devoid of polymerizable carbon-carbon unsaturation, contains less than 5% by weight of halogen, and has a weight average molecular weight of from about 25,000 to about 175,000 as measured by GPC against a polystyrene standard; and
   component 3): from 1 to 60% by weight, based on the total weight of the polymer mixture of at least one volatile compound;
into a devolatilizing extruder while at a temperature above the boiling temperature of the at least one volatile compound;

b) separating the heat-plasticized polymer mixture in the devolatilizing extruder into a devolatilized, heat-plasticized polymer blend containing not more than 3,000 ppm of volatile compounds and a separate vapor phase containing the at least one volatile compound; and c) discharging the vapor phase through at least one vent in the devolatilizing extruder barrel and discharging the devolatilized polymer blend from the devolatilizing extruder through an outlet downstream of the vent(s), wherein:

A) the devolatilized polymer blend discharged from the extruder outlet has a melt shear viscosity of no greater than 500 Pa-s at a shear rate of 100 s$^{-1}$ and of no greater than 300 Pa-s at a shear rate of 1000 s$^{-1}$ at 180° C. as measured by capillary rheometry; and B) during steps a), b) and c), the polymer mixture and the devolatilized polymer blend are maintained at a temperature of no greater than 100° C. above the glass transition temperature of the first thermoplastic polymer.

This process allows certain organic polymers which tend to dehalogenate and/or crosslink during thermal processing to be devolatilized effectively in a devolatilizing extruder, at commercially reasonable throughputs and at temperatures which are low enough to minimize thermal degradation. The second organic polymer is believed to reduce the melt shear viscosity of the polymer mixture and the devolatilized polymer blend as they travel through the extruder. The lower viscosity allows the extruder to operate using less energy input to the screw(s) (at any given screw rotational speed), and so less mechanical energy is imparted to the system at a given operating rate and screw speed. This results in a smaller temperature increase due to viscous dissipation heating, at a given screw speed, which allows lower temperatures to be maintained while operating at commercially reasonable throughputs and achieving low volatile levels in the discharged polymer blend.

For purposes of this invention, a "devolatilizing extruder" is an apparatus that contains an elongated chamber (the "extruder barrel") that includes at least one internal rotating screw which, during operation, forces the heat-plasticized polymer mixture and devolatilized polymer blend along the length of the extruder barrel towards an outlet which is located at one end of the extruder barrel. A devolatilizing extruder further contains one or more vents located along the length of the extruder barrel, through which gases but not the polymeric materials can escape from the extruder barrel during operation. A devolatilizing extruder further contains at least one inlet, upstream of the outlet and upstream of at least one vent, for introducing the heat-plasticized polymer mixture or components thereof into the extruder barrel. "Upstream" refers to the direction opposite of that of the flow of materials through the extruder barrel; "downstream" refers to the direction of the flow of materials, i.e., in the direction of the outlet from which the devolatilized polymer blend is discharged.

The devolatilizing extruder preferably contains at least two vents downstream of the inlet, and may contain three, or even more than three, such vents. The devolatilizer may contain one or more vents that are upstream of the inlet; such upstream vents are commonly referred to as "back vents", and these are typically located at or near the upstream end of the devolatilizing extruder. The vents provide a fluid path from the inside to the outside of the extruder barrel, through which gases but not the polymeric materials can escape from the extruder barrel. During operation, the pressure in the vents is lower than in the extruder barrel; the pressure in the vent(s) may be superatmospheric, atmospheric or sub-atmospheric. The design of the vents is not considered to be critical; in some embodiments, the vents are simply openings in the extruder barrel through which gasses can escape. In more complex embodiments, the vents can include various types of valving and/or pressure control mechanisms (such as, for example, a vacuum pump), collection and recovery apparatus, means for containing the polymeric materials within the extruder barrel (such as a rotating screw situated within the vent), and the like. The vents may be in fluid communication with one or more condensers which condense some or all of the removed gasses to form liquids that can be recovered for disposal or re-use.

The devolatilizing extruder may further include one or more heating and/or cooling elements located along the length of the extruder barrel, to help control the temperature of the polymeric materials as they traverse the extruder barrel to the die. The devolatilizing extruder may contain multiple (two or more) distinct heating and/or cooling zones, and may include, for example, a cooling zone located at or immediately upstream of the die.

The devolatilizing extruder also may include one or more inlets for introducing a stripping agent into the extruder barrel. Such inlet(s) are generally located prior to the last (most downstream) of the vents, but they may be provided further upstream if desired. The inlets are in fluid communication with a source of a stripping agent. Auxiliary equipment, such as valves, pumps, metering devices, pressure sensors and the like may be provided to control the flow of the stripping agent into the extruder barrel.

The devolatilizing extruder may be a single-screw type, but single screw types are useful primarily when the starting heat-plasticized polymer mixture contains lower levels of volatile compound(s), such as up to 5% by weight based on the total weight of the polymer mixture. A tangential counter-rotating twin-screw extruder may be used but is less preferred because stagnant areas can form. A particularly useful type of devolatilizing extruder is a self-wiping co-rotating twin screw extruder.

The rotation of the extruder screw(s) provides mechanical force to move the heat-plasticized polymer mixture and devolatilized polymer blend through the extruder barrel. The rotations of the screw(s) also constantly renew the surface of the polymer mixture, thereby facilitating the escape of volatile compounds. The extruder screw(s) generally include a number of elements arranged along its length. These elements can be selected from either forwarding (or right-handed) screw elements, mixing elements such as kneading disc block elements, and other special mixing elements that can be used to enhance distributive mixing. During operation, the forwarding screw elements serve to drag or push the polymer mixture and devolatilized polymer blend through the extruder barrel towards and through the die. The mixing elements such as kneading disc block elements are used for kneading and mixing.

The extruder screw(s) may additionally contain reversing elements or non-pumping barrier elements located at one or more points along its length. The reverse elements are sometimes referred to as "left-hand" elements while non-pumping barrier elements include, for example, neutral kneading disc block elements or blister rings. Elements of these types produce localized forces on the polymer mixture in the upstream direction, i.e. in the direction opposite of the mass flow of polymeric materials through the extruder barrel. These elements in some cases provide mixing within the extruder barrel, and can serve to control the flow of materials through the barrel. It is often preferable to include one or more reversing elements or non-pumping barrier elements upstream of one or more of the vent(s) and preferably upstream of each vent other than a back vent; reversing elements or non-pumping barrier elements upstream of a vent can force the polymer mixture to fully fill the barrel upstream of the vent, forming a "melt seal" which prevents volatilized materials from traveling upstream through the barrel. In this way, gasses are forced downstream from the melt seal to the next downstream vent, from which they escape from the extruder barrel. The reversing elements or non-pumping barrier elements preferably are designed so that relatively low pressures are produced in the extruder barrel. Gauge pressures at the melt seal(s), for example, preferably are no greater than about 3 MPa and are more preferably no greater than about 1.0 MPa.

The screw elements located at or near the vent(s) may be forwarding type vents, which forward the polymeric material somewhat rapidly through the region of the vent, compared to immediately upstream of the vent where a melt seal may be formed. This allows the extruder barrel to become incompletely filled with polymeric material in the region at or near the vent, creating a "head space" proximate to the where the volatilized compounds can collect and enter the vent to escape from the extruder barrel. This allows the volatilized compounds to escape while minimizing the introduction of non-volatile materials (including the polymeric components) into the vent.

In this invention, a heat-plasticized polymer mixture is introduced into the devolatilizing extruder. Its temperature at the time of introduction is above the boiling temperature (at atmospheric pressure) of the at least one volatile compound (component 3)). By "heat-plasticized", it is meant simply that the polymer mixture or devolatilized polymer blend, as the case may be, is in the form of a viscous fluid that flows through the extruder under the mechanical drag and pressure force applied by the extruder screw(s). The heat-plasticized polymer mixture may have a viscosity, for example, of from 10 to 500 Pa·s, preferably from 10 to 100 Pa·s, at a shear rate of 100 s$^{-1}$, at the time and temperature at which it is introduced into the devolatilizing extruder. It is not strictly necessary that any of the polymeric components of the polymer mixture be brought to a temperature above their crystalline melting temperatures (in the case of crystalline or semi-crystalline materials), as long as the polymer mixture is sufficiently softened that it can flow through the extruder barrel under the force of the rotating screw(s). When the polymer mixture is introduced into the devolatilizing extruder, its temperature preferably is already above the glass transition temperature of component 1). The temperature is preferably from 10 to 100° C., more preferably from 10 to 50° C., above that glass transition temperature. In absolute terms, a suitable temperature may be at least 125° C. or at least 140° C., and may be up to 230° C., up to 210° C., up to 200° C. or up to 180° C.

It is noted that the glass transition temperature of the polymer mixture as introduced into the extruder may be significantly lower than that of component 1) by itself, due to the solvating action of the volatile compound(s). In some cases, the glass transition temperature of the incoming polymer mixture may even be below room temperature (i.e., below about 25° C.).

The method by which the incoming polymer mixture is heated (if necessary) to the necessary temperature prior to its introduction into the devolatilizing extruder, is not considered to be critical to the invention. In some cases, the polymer mixture is obtained directly or indirectly from an upstream manufacturing process, examples of which are described below. The polymer mixture may be in some cases a concentrate that is obtained in an upstream partial devolatilization process, in which the solvent concentration is reduced from some higher amount into the range of 1 to 60% by weight. It is also possible to heat plasticize the polymer mixture by passing it through a first extruder, where it is melted, and then into a second, devolatilizing extruder.

The heat-plasticized polymer mixture may be introduced into the devolatilizing extruder at a superatmospheric pressure so premature escape of the volatile compound(s) is prevented.

The heat-plasticized polymer mixture is transported through the extruder barrel in the direction of the outlet. The separation of the heat-plasticized polymer mixture into a vapor phase and a devolatilized polymer blend is performed by removing at least some of the vaporized volatile compounds through one or more of the vent(s) in the extruder, leaving behind a devolatilized polymer blend that contains no more than 3,000 ppm of volatile compounds.

The polymer mixture and the devolatilized polymer blend are maintained in the extruder at a temperature above the boiling temperature (at atmospheric pressure) of the volatile compound(s). The temperature is also high enough to maintain the polymer mixture and devolatilized polymer blend in a heat-plasticized form. The temperature is no greater than 100° C. of the glass transition temperature of component 1). Preferably, the temperature is from 10 to 100° C., preferably from 10 to 50° C., above the glass transition temperature of component 1). In especially preferred processes, the temperature of the polymeric materials is maintained in the devolatilizing extruder at a temperature of no greater than 230° C., more preferably no greater than 210° C. In some embodiments, this temperature is no greater than 200° C. or no greater than 180° C. The temperature may be as low as 175° C., as low as 150° C. or even as low as 125° C. in some embodiments, provided that the temperature is high enough to convert the volatile compound(s) to a gas and to maintain the polymeric materials in a heat-plasticized form.

The temperature of the contents of the devolatilizing extruder can be controlled via several operating parameters, including, for example, (1) the temperature of the raw materials fed into the extruder, (2) the application of heat or cooling to the barrel of the extruder and (3) the amount of mechanical energy supplied to operate the screw(s). In some embodiments, cooling can be applied to the extruder barrel, or some portion thereof, to maintain the temperature of its contents to the necessary temperature. Alternately, heating can be applied to the extruder barrel, if necessary to keep the polymeric materials heat-plasticized, consistent with the temperature limitations described above. Preferably, the extruder barrel is not heated, and no applied cooling is performed, it being recognized that in the latter case some heat will be lost through the extruder barrel.

In addition, greater or smaller amounts of energy can be supplied to operate the screw in order to maintain the necessary temperatures inside the devolatilizing extruder. Greater amounts of energy to the screw generally lead to higher screw rotational speeds, which are generally desirable because higher rotational speeds tend to lead to higher throughputs per unit time and to more efficient removal of the volatile compound(s). However, if too much energy is supplied to the screw(s), the viscous dissipation heating that occurs can lead to undesirable increases in the temperature of the contents of the extruder. The amount of energy supplied to the extruder can be expressed as a specific mechanical energy input (SEI), which is estimated from the power input calculation $$P_m = P_{max} \times \frac{RPM}{RPM_{max}} \times \frac{A}{A_{max}} = P_{max} \times \frac{RPM}{RPM_{max}} \times \text{Torque \%} \quad (I)$$

where $P_m$ represents the power input to the screw motor of the devolatilizing extruder, $P_{max}$ is the rated maximum motor power for the equipment, $RPM_{max}$ is the rated extruder maximum screw rotational speed for the equipment, $A_{max}$ is the rated maximum amperage for the equipment, RPM is the actual operating screw rotational speed and A is actual the operating amperage. Specific mechanical energy input (SEI) can be estimated using Equation (II) as below.

$$SEI(J/g) = \frac{360(s/h) \times 0.9 \times P_m(kW)}{Q(kg/h)} \quad \text{(II)}$$

were Q is represents the mass per unit time of the polymer mixture fed into the devolatilizing extruder and $P_m$ is as defined in Equation I. In Equation II, the 0.9 factor represents an estimate of the fraction of the power $P_m$ that is transmitted to the screw(s), and reflects, for example, power losses within the motor and in the gearbox.

The SEI is suitably at least 150 Joules per gram of the polymer mixture (J/g), preferably at least 200 J/g and more preferably at least 250 J/g. The SEI preferably is no greater than 400 J/g and more preferably no more than 350 J/g. SEI values below about 150 J/g tend to result in slow screw rotational speeds, which results in low throughputs and/or inadequate removal of the volatiles. SEI values above about 400 J/g tend to lead to difficulties in maintaining the temperature of the contents of the extruder barrel within the desired ranges.

It is an advantage of this invention that somewhat high rotational speeds can be employed, and the resulting high throughputs can be achieved, while maintaining reasonably low temperatures in the material passing through the extruder and thus minimizing degradation of the temperature component 1) polymer.

A stripping agent may be introduced into the barrel of the devolatilizing extruder during the separation step. The stripping agent is a material that is in a gaseous or super-critical state under the conditions that exist proximate to the vent(s) that are downstream of the point(s) at which the stripping agent are introduced. The stripping agent is typically introduced as a gas (at 23° C. and 1 atmosphere pressure), a supercritical fluid, or as a low-boiling (boiling temperature 50° C. or less) liquid. The stripping agent should have low solubility in the component 1) and 2) materials. Water is an especially useful stripping agent, although gasses such as air, nitrogen, argon, carbon dioxide and the like are also useful. The amount of stripping agent is typically small, relative to the weight of the starting polymer mixture; a useful amount is from about 0.1 to about 5, preferably from about 0.25 to about 2.5 parts by weight per 100 parts by weight of the starting polymer mixture. The stripping agent is removed along with volatile compounds (the component 3) material) at vent(s) located downstream of the point(s) of introduction.

The presence of the stripping agent often helps to maintain lower temperatures of the contents in the extruder barrel (compared to an otherwise like case in which no stripping agent is added) due to reduced viscous dissipation heating, and is preferred for that reason. The use of a stripping agent also favors a more complete removal of volatile compounds.

The devolatilized polymer blend is then discharged through the extruder outlet. As used herein, the term "polymer mixture" refers to the combination of materials that is introduced into the extruder, including component 1), component 2), at least one weight percent of component 3), plus any other materials as may be introduced into the devolatilizing extruder but excluding any stripping agent and mixed with the polymeric materials (components 1) and 2)). The term "devolatilized polymer blend" refers to the devolatilized polymer stream that is produced in the devolatilizing extruder when volatile compounds are removed from the polymer mixture. The devolatilized polymer blend contains components 1) and 2), plus any other materials which are introduced into the devolatilizing extruder and which are not removed through the vent(s). The devolatilized polymer blend contains no more than 3,000 ppm of volatile compounds (component 3)).

In some embodiments, all of the components of the starting polymer mixture are combined before any of them are introduced into the devolatilizing extruder. In other embodiments, the various components of the starting polymer mixture can be introduced into the devolatilizing extruder individually, or in various sub-combinations. If the components are added separately, component 1) is generally introduced into the devolatilizing extruder together with at least part of component 3). Component 2) and any other materials as may be included (including more of component 3) may be charged to the extruder separately from component 1), either up-stream or down-stream from the point at which component 1) is added. If added separately to the devolatilizing extruder, components 1) and 2) should each be added at a temperature above their respective glass transition temperatures.

The devolatilized polymer blend that remains after removal of volatile compounds is then discharged through an outlet of the devolatilizing extruder. This outlet is downstream of the last of the vent(s); typically the outlet is a die that is located at a terminus of the extruder barrel. Such a die produces an extrudate that can have any useful cross-section. One useful type of die produces an extrudate having a cross-sectional area of from 0.1 to 6 cm$^2$, preferably from 0.25 to 2 cm$^2$. The extrudate can be cooled by immersion into a liquid bath or by other useful means, to solidify the material.

The solidified extrudate may be chopped into granules that are useful for subsequent melt-processing operations.

Component 1) of the polymer mixture is a thermoplastic organic polymer that contains polymerizable carbon-carbon unsaturation, at least 10% by weight of aliphatically bound halogen, or both. Aliphatic carbon-carbon double bonds (such as vinyl groups, allyl groups and the like) and aliphatic carbon-carbon triple bonds are examples of polymerizable carbon-carbon unsaturation. Preferred component 1) polymers contain at least 25% by weight of aliphatically bound halogen. The component 1) polymer may contain up to 75% by weight of aliphatically bound halogen. The halogen is preferably chlorine or, more preferably, bromine.

The component 1) polymer preferably has a glass transition temperature of 220° C. or less, more preferably 180° C. or less, and still more preferably at a temperature of 80 to 180° C. It preferably is a solid at 25° C. Its molecular weight is not considered to be critical to the invention. In general, the component 1) polymer may have a weight average molecular weight ($M_w$), as measured by gel permeation chromatography against a polystyrene standard, of from 25,000 to 400,000, preferably from 25,000 to 300,000 and more preferably from 50,000 to 200,000.

The component 1) polymer preferably has a melt shear viscosity at 180° C. of greater than 200 Pa·s, preferably greater than 500 Pa·s, at a shear rate of 100 s$^{-1}$ and a melt shear viscosity at 180° C. of greater than 100 Pa·s, preferably greater than 300 Pa·s, at a shear rate of 1000 s$^{-1}$.

The component 1) polymer may be a block copolymer, in which one or more of the blocks contains polymerizable carbon-carbon unsaturation and/or aliphatically bound halogen (and thus is more thermally sensitive), and in which one or more other blocks is substantially devoid of polymerizable carbon-carbon unsaturation and aliphatically bound halogen (and thus is less thermally sensitive).

Examples of component 1) polymers that have polymerizable carbon-carbon unsaturation include polymers and copolymers of a conjugated diene monomer, such as polymers and copolymers of butadiene and/or isoprene. Preferred among these types are block copolymers of a conjugated diene monomer such as butadiene or isoprene and a vinyl aromatic monomer such as styrene. Such a block copolymer should contain blocks of the polymerized conjugated diene monomer that constitute from 20 to 90% by weight of the block copolymer. The molecular weight of the conjugated diene monomer blocks should be from 10,000 to 150,000. The block copolymer may be, for example, a diblock copolymer of butadiene and styrene or a triblock copolymer having a central polybutadiene block and outer polystyrene blocks.

Examples of suitable halogenated component 1) polymers include those obtained by halogenating, especially brominating, a starting polymer that has ethylenic unsaturation. Suitable such starting polymers include, for example, (i) homopolymers and copolymers of a conjugated diene such as butadiene, isoprene or a 1,3-cycloaliphatic diene; (ii) a polymer or copolymer of allylmaleimide, especially a copolymer thereof with styrene; (iii) an aliphatically unsaturated polyester; (iv) an allyl ether of a novolac resin, (v) a ROMP polymer or copolymer or (vi) a poly(4-vinyl phenol allyl ether). Some of these starting polymers are described in WO 2007/019120.

One preferred type of component 1) polymer is a halogenated, especially brominated, copolymer of butadiene and at least one vinyl aromatic monomer. Such a copolymer may be a random, block or graft copolymer. A "vinyl aromatic" monomer is an aromatic compound having a polymerizable ethylenically unsaturated group bonded directly to a carbon atom of an aromatic ring. Vinyl aromatic monomers include unsubstituted materials such as styrene and vinyl naphthalene, as well as compounds that are substituted on the ethylenically unsaturated group (such as, for example alpha-methylstyrene), and/or are ring-substituted. Ring-substituted vinyl aromatic monomers include those having halogen, alkoxyl, nitro or unsubstituted or substituted alkyl groups bonded directly to a carbon atom of an aromatic ring. Examples of such ring-substituted vinyl aromatic monomers include 2- or 4-bromostyrene, 2- or 4-chlorostyrene, 2- or 4-methoxystyrene, 2- or 4-nitrostyrene, 2- or 4-methylstyrene and 2,4-dimethylstyrene. Preferred vinyl aromatic monomers are styrene, alpha-methyl styrene, para-methyl styrene, and mixtures thereof. A useful starting butadiene polymer contains, prior to halogenation, at least 10% by weight of polymerized butadiene.

Halogenated styrene/butadiene copolymers are especially preferred. Halogenated styrene/butadiene block copolymers that are useful can be prepared by halogenating the starting styrene/butadiene block copolymer such as those available from Dexco Polymers under the trade designation VECTOR™ are suitable.

A halogenated butadiene polymer may also contain repeating units formed by polymerizing monomers other than butadiene and a vinyl aromatic monomer. Such other monomers include olefins such as ethylene and propylene, acrylate or acrylic monomers such as methyl methacrylate, methyl acrylate, acrylic acid, and the like. These monomers may be randomly polymerized with the vinyl aromatic monomer and/or butadiene, may be polymerized to form blocks, or may be grafted onto the starting butadiene copolymer.

The most preferred type of halogenated butadiene polymer is prepared by halogenating, especially brominating, a block copolymer containing one or more polystyrene blocks and one or more polybutadiene blocks. Among these, diblock and triblock copolymers are especially preferred. In either case, the polystyrene block may have a molecular weight of from 10,000 to 100,000, preferably from 20,000 to 50,000, and the terminal butadiene block(s) may have molecular weights (prior to halogenation) of from 10,000 to 100,000.

Halogenated copolymers of styrene and allylmaleimide include those in which styrene and 2,3-dibromoallylmaleimide repeating units alternate, and those in which styrene and 2,3-dibromopropylmaleimide repeating units form blocks of two or more consecutive units of the same type. The mole ratio of styrene to 2,3-dibromoallyl maleimide repeating units in the copolymer can range from 95:5 to about 40:60, but 2,3-dibromoallyl maleimide levels towards the high end of this range (such as from 30 to 60 mole percent maleic anhydride) are preferred for their higher bromine contents.

Halogenated aliphatic polyesters include those having an -A-B- structure, in which A represents a dicarboxylic acid repeating unit and B represents a diol repeating unit. Some or all of the A and/or B units contain, prior to halogenation, non-aromatic carbon-carbon unsaturation, which are halogenated. Polyesters of this type can be prepared in a reaction of a dicarboxylic acid (or corresponding acid halide or anhydride) with a diol, at least one of which contains non-aromatic carbon-carbon unsaturation, followed by halogenation, especially bromination. Examples of dicarboxylic acids and corresponding anhydrides having non-aromatic carbon-carbon unsaturation include maleic acid, maleic anhydride, fumaric acid, fumaric anhydride, tetrahydrophthalic acid, tetrahydrophthalic anhydride, i.e.,

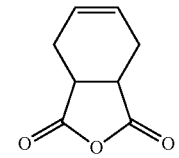 [SMILES: O=C1OC(=O)C2CC=CCC12]

and the like. Those diacids or anhydrides and/or their respective acid halides can be used to prepare a starting polyester that has A units with non-aromatic carbon-carbon unsaturation. 1,4-Dihydroxy-but-2-ene is an example of a diol having non-aromatic carbon-carbon unsaturation, and can be used to make a starting copolymer having B units that have corresponding unsaturation. Specific types of unsaturated polyesters that can be halogenated to form a component 1) material include, for example, polyesters of maleic acid or a maleic acid/fumaric acid mixture, optionally one or more additional diacids, and one or more aliphatic diols; polyesters of tetrahydrophthalic anhydride with one or more aliphatic diols; polyesters of tetrahydrophthalic anhydride at least one additional diacid (or corresponding acid halide or anhydride) and one or more aliphatic diols; and polyesters of 1,4-dihydroxy-but-2-ene with one or more diacids (or corresponding acid halides or anhydrides).

Polymer type iv) is a halogenated allyl ester of a novolac resin. By "novolac" resin, it is meant a polymer of formaldehyde and a phenolic compound such as phenol or cresol. The phenolic compound optionally may contain 1 or 2 substituent groups on the ring (which may include halogen such as bromine). The halogenated allyl ester can be prepared from a novolac resin, many of which are commercially available. Allyl ether groups can be introduced by reaction of a phenolic hydroxyl group with sodium hydride to form alkoxide groups, which then react with an allyl halide such as allyl chloride or allyl bromide to produce the ether. Halogenation is then performed on the allyl groups.

Suitable halogenated ROMP polymers (polymer type v) can be made by halogenating homopolymers or copolymers that are formed in a ring-opening metathesis polymerization (ROMP) process from certain non-aromatic cyclic monomers that have carbon-carbon unsaturation in a ring structure. Examples of useful halogenated ROMP polymers include halogenated, especially brominated, homopolymers and copolymers of cyclopentene, cyclooctene, norbornene, cyclohexenylnorbornene, exo-norbornene dicarboxylic anhydride and dicyclopentadiene. Examples of suitable comonomers include cyclic olefins such as cyclooctene. The ROMP polymers and copolymers contain carbon-carbon double bonds in the main polymer chain, which can be halogenated.

Polymers of type (vi) are described in WO 2007/019120.

The component 2) material is at least one second thermoplastic organic polymer, which is compatible with component 1) at the relative amounts thereof that are present, and which is substantially devoid of polymerizable carbon-carbon unsaturation and contains less than 5% by weight of aliphatically bound halogen. The component 2) polymer has a weight average molecular weight of from about 25,000 to about 175,000 as measured by GPC against a polystyrene standard. GPC molecular weight determinations, for purposes of this invention, can be performed using an Agilent 1100 series liquid chromatograph equipped with two Polymer Laboratories PLgel 5 micrometer Mixed-C columns connected in series and an Agilent G1362A refractive index detector, or equivalent device with tetrahydrofuran (THF) or other suitable solvent flowing at a rate of 1 mL/min and heated to a temperature of 35° C. as the eluent.

The component 2) material preferably has a lower melt shear viscosity that is lower than that of the component 1) materials. The component 2) polymer preferably has a melt shear viscosity at 180° C. of less than 200 Pa·s at a shear rate of 100 $s^{-1}$ and a melt shear viscosity at 180° C. of less than 100 Pa·s at a shear rate of 1000 $s^{-1}$.

The component 1) and component 2) materials are said to be "compatible" for purposes of this invention if in the devolatilized polymer blend exiting the devolatilizing extruder they form a co-continuous phase at the relative proportions thereof that are present, or else form a dispersion in which one of components 1) and 2) is dispersed in the other with the dispersed phase having a volume average domain size of no greater than 25 microns. If components 1) and 2) form a dispersion, it is preferred that the component 1) material represents the disperse phase. In general, the lower viscosity polymer (preferably the component 2) material) will tend to form the continuous phase if a dispersion is formed.

Component 2) should have a glass transition temperature of at least 80° C. but at 220° C. or less, preferably 200° C. or less, more preferably from about 80 to 180° C. or from 80 to 150° C.

In cases in which the component 1) material is a block copolymer in which one or more of the blocks contains aliphatically bound halogen and in which one or more other blocks is substantially devoid of polymerizable carbon-carbon unsaturation and aliphatically bound halogen, the component 2) material is preferably compatible with those blocks of the component 1) material which are devoid of polymerizable unsaturation and aliphatically bound halogen. In such a case, it is especially preferred that the component 2) material is a polymer of the same monomer(s) as the block(s) of the component 1) material that are devoid of polymerizable carbon-carbon unsaturation and aliphatically bound halogen. It is believed that, during the devolatilization extrusion step, the blocks of the component 1) material which contain aliphatically bound halogen form small, isolated domains in the melt. Although the invention is not limited to any theory, it is further believed that any halogen which does become liberated during the devolatilizing extrusion step tends to be largely confined to within the domain in which it forms. In this way, any further dehalogenation reactions that are catalyzed by the liberated halogen are believed to remain largely isolated to the specific small domain of the component 1) material in which the halogen has been liberated, thus limiting the further spread of the thermal degradation reactions.

The component 2) material preferably is a polymer or copolymer of a vinyl aromatic monomer. An especially preferred component 2) material is a homopolymer or copolymer of styrene. Useful polystyrene polymers are commercially available; these include, for example, Styron™ PS640, available from Styron LLC, and Piccolastic™ D125, available from Eastman Chemicals.

The relative amounts of the component 1) and 2) materials are selected, together with the presence of any other non-volatile materials as may be present, such that the polymer blend discharged from the devolatilizing extruder has a melt shear viscosity at 180° C. of no greater than 500 Pa·s at a shear rate of 100 $s^{-1}$ and of no greater than 300 Pa·s at a shear rate of 1000 $s^{-1}$. This is generally accomplished when from about 0.25 to about 4 parts by weight of component 1) are present per part by weight of component 2). A preferred ratio is from about 0.5 to about 2 parts by weight of component 1) per part by weight of component 2). A more preferred ratio is from 0.65 to about 1.5 parts by weight of component 1) per part by weight of component 2).

Component 3) can be any volatile compound or mixture of compounds which is to be removed from the component 1) material. By "volatile" it is meant that the compound has a boiling temperature of no greater than 150° C., preferably no greater than 125° C., at one atmosphere pressure. The volatile compound may be or include, for example, water; organic solvents (such as solvents used in the manufacture and/or subsequent treatment of the component 1) material), residual monomers; volatile catalyst residues; volatile by-products from the manufacture of the component 1) material, and the like. Component 3) typically includes one or more organic solvents; these may include, for example, hydrocarbons such as benzene, toluene, alkanes, cycloalkanes and the like; halogenated alkanes such as carbon tetrachloride, chloroform, dichloromethane, bromochloromethane, dibromomethane and 1,2-dichloroethane; various ether, aldehyde or ketone compounds, as well as other low molecular weight organic solvents.

The amount of volatile compounds in the starting polymer mixture may range from about 1 to about 60% by weight, based on the total weight of the polymer mixture. At higher amounts than in this range, the melt shear viscosity of the polymer mixture may be too low for it to be extrudable. A preferred amount is at least 2% by weight, or at least 5% by weight, up to about 40% by weight or up to about 35% by weight.

In some embodiments, a mixture of components 1) and 3) is a solution formed in a halogenation reaction of a starting polymer that contains aliphatic carbon-carbon unsaturation (such as, for example, a polymer of a conjugated diene, especially a block copolymer of a conjugated diene such as butadiene or isoprene and a vinyl aromatic monomer such as styrene). In the reaction, a halogen, preferably bromine, is added across the aliphatic carbon-carbon unsaturation. The reaction is performed in a solvent, and the brominated polymer is obtained in the form of a solution in the solvent, which forms all or part of the component 3) material. The bromination may be performed using a direct bromination process, in which e.g., the starting butadiene polymer is brominated with elemental bromine as described in WO 2008/021418. An aliphatic alcohol may be present during the bromination reaction, also as described in WO 2008/021418; this alcohol may also form a part of the component 3) material. Alternatively, the aliphatic bromine-containing polymer may be obtained by brominating the starting polymer with a quaternary ammonium tribromide as described, for example, in WO 2008/021417. Residual bromine and other by-products can be removed from the halogenated polymer solution that is obtained from the halogenation reaction. Extraction and washing methods can be used to accomplish this; the extractant and/or washing fluid may also form all or a part of the component 3) material. If too much solvent and/or other volatile compounds are present in the halogenated polymer solution, the solution may be concentrated by various solvent removal techniques such as flash distillation or other distillation methods, before performing the devolatilizing extrusion step of this invention.

The polymer mixture may contain various optional components, in addition to components 1), 2) and 3) as already described. These may include, for example, various lubricants (such as barium stearate or zinc stearate), UV stabilizers, pigments or other colorants, nucleating agents, plasticizers, FR agents, FR synergists, IR blockers, and the like.

A preferred type of optional component is one or more thermal stabilizers. Thermal stabilizers are materials which, when in admixture with the component 1) material, increase its resistance to thermal degradation. These may operate via various mechanisms, such as by scavenging free radicals, acting as antioxidants, blocking degradation pathways, and the like; the particular mechanism(s) by which the thermal stabilizers operate are not considered to be critical to the invention. The thermal stabilizer(s) may constitute up to 20 percent of the weight of the polymer mixture. A preferred amount is from 1 to 20 percent, and more preferred amount is from 5 to 20 percent. The thermal stabilizers should not be volatile compounds, a defined before, and so will remain in the polymer blend after volatile compounds are separated from the starting polymer mixture in accordance with this invention.

Preferred stabilizers, especially when the component 1) material contains aliphatically bound halogen, include alkyl phosphites and epoxy compounds. Alkyl phosphites and epoxy compounds may be used in combination.

Suitable alkyl phosphites are described in "Plastic Additive Handbook", edited by H. Zweifel, 5th Ed., p. 441 (2001). The alkyl phosphite compound contains at least one

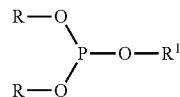

group, in which each R group is an unsubstituted or substituted alkyl group. The two R groups together may form a divalent group, which may be substituted, that bonds to the adjacent —O— atoms through an aliphatic carbon to form a ring structure that includes the —O—P—O— linkage. The R groups may be linear or branched. The carbon atom on the R groups that is adjacent to and bonded to the —O— atom is preferably a methylene (—CH$_2$—) carbon. Substituent groups on the R groups may be, for example, aryl, cycloalkyl,

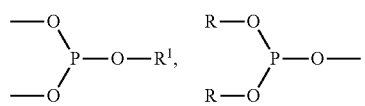

or an inert substituent. The $R^1$ group in the foregoing structures may be another R group, or an aryl or substituted aryl group.

A preferred type of $R^1$ group is an aryl group that is substituted with at least one branched alkyl group that contains a tertiary carbon atom. The branched alkyl group that contains a tertiary carbon atom may be further substituted with one or more aryl groups. Another preferred type of $R^1$ group is an alkyl group, which may be branched or linear, having from 2 to 30, preferably from 8 to 20, carbon atoms. Examples of suitable $R^1$ groups include dodecyl, tetradecyl, hexadecyl, octadecyl, 2,4-di-(t-butyl)-phenyl,

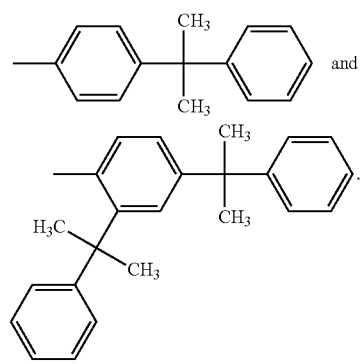

A preferred alkyl phosphite is a pentaerythritol diphosphite compound. These materials have the structure

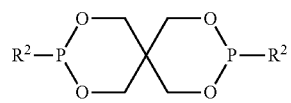

wherein $R^2$ is an unsubstituted or substituted, linear or branched, alkyl group, an aryl group or a substituted aryl group.

Specific examples of preferred alkyl phosphites include bis(2,4-dicumylphenyl)pentaerythritol diphosphite, distearylpentaerythritol diphosphite and di (2,4-di-(t-butyl)phenyl)pentaerythritol diphosphite. These are commercially available as Doverphos™ S-9228 (Dover Chemical Corporation), Doverphos™ S-682 (Dover Chemical Corporation) and Irgafos™ 126 (Ciba Specialty Chemicals).

Epoxy compounds that are useful as a thermal stabilizer contain on average at least one and preferably two or more epoxide groups per molecule. The epoxy compound preferably has an equivalent weight per epoxide group of no more than 2000, preferably no more than 1000 and even more preferably no more than 500. The molecular weight of the epoxy compound is at least 1000 in preferred embodiments. The epoxy compound may be brominated. A variety of commercially available epoxy resins are suitable. These may be based, for example, on a bisphenol compound, such as various diglycidyl ethers of bisphenol A. They may be based on a brominated bisphenol compound. The epoxy compound may be an epoxy novolac resin, or an epoxy cresol novolac resin.

The epoxy compound may be an entirely aliphatic material, such as a diglycidyl ether of a polyether diol or an epoxidized vegetable oil. Examples of commercially available epoxy compounds that are useful herein include F2200HM and F2001 (from ICL Industrial Products), DEN 439 (from The Dow Chemical Company), Araldite ECN-1273 and ECN-1280 (from Huntsman Advanced Materials Americas, Inc.), and Plaschek 775 (from Ferro Chemical Co.).

Other thermal stabilizers can be used, by themselves or in addition to the alkyl phosphite and/or the epoxy compound. Examples of such materials include, for example, inorganic materials such as tetrasodium pyrophosphate, hydrocalumite, hydrotalcite and hydrotalcite-like clays; polyhydroxyl compounds having a molecular weight of 1000 or below, such as pentaerythritol, dipentaerythritol, glycerol, xylitol, sorbitol or mannitol, or partial esters thereof; and organotin stabilizers which may be allylophilic and/or dieneophilic. The organotin compounds include, for example, alkyl tin thioglycolates, alkyl tin mercaptopropionates, alkyl tin mercaptides, alkyl tin maleates and alkyl tin (alkylmaleates), wherein the alkyls are selected from methyl, butyl and octyl. Suitable organotin compounds are available commercially from Ferro Corporation (i.e., Thermchek™ 832, Thermchek™ 835), and Baerlocher GmbH (i.e., Baerostab™ OM 36, Baerostab™ M25, Baerostab™ MSO, Baerostab™ M63, Baerostab™ OM 710S).

A preferred thermal stabilizer is a combination of a) an alkyl phosphite and b) an epoxidized vegetable oil, optionally further containing c) an epoxy cresol novolac resin.

The thermal stabilizer(s) may in some cases function as lubricants or plasticizers, reducing the shear viscosity of the devolatilized polymer blend and in that manner further reducing frictional heat generation during the devolatilizing extrusion step. This effect is especially seen when certain epoxides such as epoxidized vegetable oils are present.

The devolatilized polymer blend that remains after separation of volatile compounds contains no more than 3,000 ppm of volatile compounds. It may contain no more than 2,000 ppm or no more than 1,000 ppm of those compounds.

The devolatilized polymer blend is further characterized in having a melt shear viscosity at 180° C. of no greater than 500 Pa·s at a shear rate of 100 s$^{-1}$ and of no greater than 300 Pa·s at a shear rate of 1000 s$^{-1}$. The polymer blend preferably has a melt shear viscosity at 180° C. of no greater than 200 Pa·s at a shear rate of 100 s$^{-1}$ and of no greater than 100 Pa·s at a shear rate of 1000 s$^{-1}$. This melt shear viscosity is mainly determined by the specific component 1) and component 2) materials that are selected, in addition to other materials as may be present, and of course by the ratios of those components. Any volatile compounds that remain in the devolatilized polymer blend tend to have negligible effect on the melt viscosity, due to the small amounts that are present.

In a specific embodiment of the invention, a solution of a brominated butadiene-styrene block copolymer in a solvent from the halogenation reaction is used as a starting material. The brominated butadiene-styrene block copolymer corresponds to component 1) and the solvent forms all or part of component 3). The solution may contain from 20 to 95% by weight solvent, preferably from 50 to 90% solvent. This solution is blended with a polystyrene resin having a molecular weight of from 25,000 to 175,000 (component 2) and, preferably, with one or more thermal stabilizers. The resulting blend is heated (if necessary) to a temperature sufficient to melt or soften the component 2 material, or dissolve it into the solvent. The blend is then partially devolatilized by flashing a portion of the solvent at a temperature of from 100 to 220° C., preferably from 130 to 160° C. The solvent content may be reduced into the range of from 1 to 60% by weight in this partial devolatilization step. The partially devolatilized blend is then fed as a melt or softened material into the devolatilizing extruder, where it is processed as described before to produce the devolatilized polymer blend.

A devolatilized polymer blend is recovered from the process. In the most preferred case in which the component 1) material contains aliphatically bound halogen, this polymer blend is useful as a flame retarding agent for a variety of organic polymers which, for purposes of this invention, are referred to as a "bulk polymer". In such flame retardant applications, the polymer blend is combined with the bulk polymer and fabricated into some useful article. The fabrication step is typically performed in a melt-processing operation, in which the bulk polymer and the polymer blend obtained from this invention are melted and formed. Melt processing, for purposes of this invention, involves creating a melt of the bulk polymer and the polymer blend obtained from the devolatilizing extrusion step, forming the melt, and then cooling the melt to solidify it and produce an article. Various melt processing operations, such as extrusion, injection molding, compression molding, casting, and the like can be used as desirable in any specific case. The melt processing operation of most interest is extrusion foaming.

It is preferred to combine enough of the polymer blend obtained from this invention with the bulk polymer to provide the resulting material with a bromine content within a range of from 0.1 percent by weight to 25 percent by weight, based upon blend weight. A preferred bromine concentration in the blend (provided by the polymer blend from the melt devolatilization extrusion process) is from 0.25 to 10 percent by weight, a more preferred amount is from 0.5 to 5 weight percent, and a still more preferred amount is from 1 to 3 weight percent. The amount of polymer blend that is needed to provide a given bromine content to the blend will of course depend on its bromine content. In general, however, as little as about 0.25 parts by weight of the polymer blend can be provided per 100 parts by weight bulk resin (pphr). At least 0.5 pphr or at least 1.2 pphr of the polymer blend can be provided. Up to 200 pphr of the polymer blend can be used, but a more preferred maximum amount is 100 pphr, a more preferred maximum amount is 40 pphr and a still more preferred maximum amount is 20 pphr or even 15 pphr.

The bulk polymer should be thermoplastic for use in a melt processing step. It should have a weight average molecular weight of greater than 175,000, preferably greater than 200,000 (as measured by GPC against a polystyrene standard), and have a melting or softening temperature of at least 100° C. to about 325° C. Thermoplastic polymers of interest as the bulk polymer include vinyl aromatic polymers (including vinyl aromatic homopolymers, vinyl aromatic copolymers, or blends of one or more vinyl aromatic homopolymers and/or vinyl aromatic copolymers), as well as other organic polymers in which the aliphatic bromine-containing polymer is soluble or can be dispersed to form domains of predominantly less than 25 μm, preferably less than 10 μm, in size. Polymers and copolymers of styrene are preferred. Most preferred are polystyrene homopolymers, and copolymers of styrene with ethylene, propylene, acrylic acid, maleic anhydride, and/or acrylonitrile. Polystyrene homopolymer is most preferred. Blends of any two or more of the foregoing polymers, or of one or more of the foregoing polymers with another resin, also can be used as the bulk polymer.

In an especially preferred case, a polymer blend which is devolatilized in accordance with the invention and which contains a) a halogenated block copolymer of a conjugated diene and a vinyl aromatic polymer, especially a halogenated butadiene-styrene block copolymer, and b) a polymer of a vinyl aromatic monomer such as styrene, is melt processed with a bulk polymer which is a polymer of at least one vinyl aromatic monomer, such as styrene.

A melt processing operation can include other additives, such as, for example, lubricants such as barium stearate or zinc stearate; UV stabilizers, pigments, nucleating agents, plasticizers, FR synergists, IR blockers, and the like.

Extrusion foaming is performed by forming a pressurized melt that contains the bulk polymer, the polymer blend obtained from the devolatilizing extrusion step, a blowing agent, the alkyl phosphite and/or the epoxy compound and other additives such as may be useful. Once the raw materials have been mixed and the polymers melted, the resulting gel is forced through an opening into a zone of lower pressure, where the blowing agent expands and the polymer solidifies to form a foam. The extruded foam can take the form of a sheet (having a thickness of up to ½ inch (12 mm)), plank or boardstock (having a thickness of from ½ inch (12 mm) to 12 inches (30 cm) or more), or other convenient shape. The foam can be extruded to form coalesced strand foam if desired.

The blowing agent in an extrusion foaming process can be an exothermic (chemical) type or an endothermic (physical) type. Physical blowing agents such as carbon dioxide, various hydrocarbons, hydrofluorocarbons, water, alcohols, ethers and hydrochlorofluorocarbons are especially suitable.

Boardstock foams made in accordance in such a foaming extrusion process are useful as building foam insulation, as part of roof or wall assemblies. Other foams made in accordance with the invention can be used as decorative billet, pipe insulation and in molded concrete foundation applications.

A devolatilized polymer blend made in accordance with the invention is also useful as a flame retardant for expanded bead foams. Such foams can be prepared, for example, by dissolving the devolatilized polymer blend into a monomer or monomers, suspension polymerizing the monomer(s) to form polymer beads which are then infused with a blowing agent to form expandable polymer beads, and then thermally expanding the expandable polymer beads to form a foamed article.

The following examples are provided to illustrate the invention, but not to limit the scope thereof. All parts and percentages are by weight unless otherwise indicated.

EXAMPLES 1-4

Formulations 1-4 as set forth in Table 1 are processed through a tandem devolatilization extrusion line. The line consists of a TEX-65α twin-screw extruder, which has a length:diameter ratio of 49, and which feeds a TEX-30α twin-screw devolatilizing extruder. The first extruder is used to melt the resin components of each formulation and combine them with the stabilization package and solvent as indicated in Table 1. The materials achieve a temperature of about 145° C. in the first extruder, and are discharged into the devolatilizing extruder at that temperature.

The devolatilizing extruder has a length/diameter ratio of 56. It consists of 13 sections. The feed inlet is located in the third section. A back vent is located in the first section. Forward vents are located in the sixth, ninth and twelfth sections. Each of the vents is connected to a vacuum pump which operates to maintain a predetermined pressure at the respective vents as follows: back vent: 0.09 MPa absolute; first forward vent, 0.004 MPa absolute; second and third forward vents: 0.003 MPa absolute. The screws are designed to produce melt seals upstream of each forward vent. The devolatilizing extruder also has injection ports located in the eight and eleventh sections. The outlet for the devolatilized polymer blend follows the thirteenth section.

The amount of polymer mixture introduced from the first extruder into the devolatilizing extruder is 55 kg/hr. Screw speeds are indicated in Table 2 below. Water is injected through each of the injection ports in some cases; if so, the amounts of water are as indicated in Table 2 below. The temperature of the discharged polymer blend is measured.

Table 1 identifies the composition of each of the formulations, and indicates the melt shear viscosity of each of them (less the solvent) at 175° C. at various shear rates.

TABLE 1

| | Formulation Number | | | |
|---|---|---|---|---|
| | 1 | 2 | 3 | 4 |
| | Parts by Weight | | | |
| Ingredient | | | | |
| SBS block copolymer[1] | 64 | 48 | 55.92 | 41.94 |
| Polystyrene A[2] | 16 | 32 | 13.98 | 27.96 |
| Cyclohexane | 19.9 | 19.9 | 30 | 30 |
| Thermal stabilizer[3] | 0.1 | 0.1 | 0.1 | 0.1 |
| Approximate Melt shear viscosity, 175° C., Pa · s | | | | |
| 69.6 s$^{-1}$ shear rate | 489 | 316 | 489 | 316 |
| 695.7 s$^{-1}$ shear rate | 338 | 139 | 338 | 139 |

[1] An 80,000 $M_w$ styrene butadiene triblock copolymer marketed as VECTOR ™ 6241 by Dexco Polymers.
[2] Piccolastic D-125, from Eastman Chemicals. This material has an $M_w$ of approximately 35,000-40,000.
[3] A 50/50 by weight mixture of an alkyl phosphite marketed as Doverphos S-9228 by Dover Chemical Corporation and a hindered phenol marketed by BASF as Irganox 1010.

The shear rate data in Table 1 demonstrate that each of Formulations 1-4 will provide a polymer blend having a melt shear viscosity at 180° C. of no greater than 500 Pa·s at a shear rate of 100 s$^{-1}$ and of no greater than 300 Pa·s at a shear rate of 1000 s$^{-1}$, as melt shear viscosities decrease with both increasing temperature and increasing shear rates.

Formulations 1-4 are separated processed through the tandem extruder system, in the manner described above. The example numbers correspond to the formulation numbers. If the same formulation is used multiple times, the runs are distinguished by an alphabetic suffix (A, B, etc.). Screw speeds, the amount of water injected as a stripping agent, the measured discharge temperature from the devolatilizing extruder, and the cyclohexane content of the extrudate are as reported in Table 2.

TABLE 2

| Example No. | Screw speed (rpm) | Water injection, pph | Discharge Temperature, ° C. | Residual Cyclohexane, ppm |
|---|---|---|---|---|
| 1A | 290 | 0 | 211 | 658 |
| 1B | 290 | 1 | 206 | 690 |
| 1C | 370 | 1 | 215 | 9 |
| 2A | 290 | 0 | 199 | 866 |
| 2B | 290 | 1 | 192 | 719 |
| 3A | 290 | 0 | 211 | 840 |
| 3B | 290 | 1 | 206 | 705 |
| 4 | 290 | 0 | 197 | 1138 |

The data in Table 2 shows that low discharge temperatures can be obtained with this invention at high operating rates and at high screw speeds, and with effective removal of volatile compounds. The use of a stripping agent is seen to reduce the discharge temperature and residual solvent levels.

EXAMPLES 5-10

Formulations 5-10 as set forth in Table 3 are processed through a tandem devolatilization extrusion line as described in the previous examples. The example numbers correspond to the formulation numbers. If the same formulation is used multiple times, the runs are distinguished by an alphabetic suffix (A, B, etc.). Conditions and results are as indicated in Table 4.

TABLE 3

| Ingredient | Formulation Number | | | | | |
|---|---|---|---|---|---|---|
| | 5 | 6 | 7 | 8 | 9 | 10 |
| | Parts By Weight | | | | | |
| Brominated SBS block copolymer[1] | 31.5 | 31.5 | 31.5 | 31.5 | 31.5 | 31.5 |
| Polystyrene A[2] | 0 | 0 | 0 | 0 | 0 | 7 |
| Polystyrene B[3] | 28 | 28 | 28 | 28 | 28 | 21 |
| Cyclohexane | 30 | 30 | 30 | 0 | 0 | 30 |
| Dibromomethane | 0 | 0 | 0 | 30 | 30 | 0 |
| Epoxidized cresol novolac resin | 5.25 | 2.63 | 0 | 5.25 | 2.63 | 5.25 |
| Alkyl phosphite[4] | 2.63 | 2.63 | 2.63 | 2.63 | 2.63 | 2.63 |
| Epoxidized soybean oil | 2.63 | 5.25 | 7.88 | 2.63 | 5.25 | 2.63 |
| Shear viscosity, 180° C., Pa·s | | | | | | |
| ~80-90 s$^{-1}$ | 487 | 418 | 341 | 475 | 381 | 307 |
| ~850-950 s$^{-1}$ | 141 | 114 | 92 | 125 | 107 | 97 |

[1] A brominated styrene-butadiene block copolymer marketed by Chemtura as Chemtura SR8928P.
[2] Piccolastic D-125, from Eastman Chemicals.
[3] A polystyrene having an $M_w$ of approximately 140,000, marked by Styron LLC as PS 640 resin.
[4] Doverphos ™ S-9228.

The shear rate data in Table 3 demonstrate that each of Formulations 1 and 2 will provide a polymer blend having a melt shear viscosity at 180° C., of no greater than 500 Pa·s at a shear rate of 100 s$^{-1}$ and of no greater than 300 Pa·s at a shear rate of 1000 s$^{-1}$ as melt shear viscosities decrease with both increasing temperature and increasing shear rates. In Example 7, the presence of a larger amount of the epoxidized soybean oil is seen to reduce shear viscosity significantly at the higher shear rate, and provides excellent thermal stabilization even in the absence of the epoxidized cresol novolac resin.

TABLE 4

| Ex. No. | Screw speed (rpm) | $P_s$ (kW)[1] | SEI (J/g)[1] | Water injection, 1$^{st}$ port (kg/hr) | Water injection, 2$^{nd}$ port (kg/hr) | Discharge temperature, ° C. | Residual solvent, ppm |
|---|---|---|---|---|---|---|---|
| 5A | 350 | 4.7 | 308 | 0 | 0 | 220 | 728 |
| 5B | 350 | ND* | ND | 0.53 | 0.62 | 214 | 179 |
| 5C | 190 | 2.9 | 190 | 0.51 | 0.63 | 197 | 1246 |
| 6A | 350 | ND | ND | 0 | 0 | 211 | 824 |
| 6B | 350 | ND | ND | 0.52 | 0.67 | 207 | 553 |
| 6C | 190 | 2.3 | 151 | 0.53 | 0.66 | 188 | 2623 |
| 7A | 350 | ND | ND | 0 | 0 | 207 | 750 |
| 7B | 350 | ND | ND | 0.56 | 0.61 | 197 | 607 |
| 8 | 350 | 5.0 | 327 | 0.54 | 0.62 | 211 | 1246 |
| 9A | 350 | 4.2 | 275 | 0 | 0 | 212 | 3044 |
| 9B | 350 | 4.7 | 308 | 0.52 | 0.64 | 211 | 849 |
| 9C | 190 | 4.4 | 288 | 0.52 | 0.64 | 190 | 2429 |

[1] $P_s$ is energy input to the screw, calculated as $P_m$ (per equation I above) times 0.9. SEI is specific energy input, calculated as (3600 s/hr × $P_s$)/55 kg/hr.
*ND is not determined.

The data in Table 4 again shows that low discharge temperatures can be obtained with this invention at high operating rates and at high screw speeds, and with effective removal of volatile compounds. The use of a stripping agent is seen to reduce the discharge temperature and residual solvent levels. Higher screw speeds (higher SEI) are seen to lead to lower residual solvent contents (under equivalent conditions), probably due to better renewal of the polymer surface.

What is claimed is:
1. A melt devolatilization extrusion process, comprising
   a) feeding a heat-plasticized polymer mixture that includes
      component 1): at least one first thermoplastic polymer containing polymerizable carbon-carbon unsaturation, at least 10% by weight of aliphatically bound halogen, or both;
      component 2): at least one second thermoplastic organic polymer, which is compatible with component 1) at the relative amounts thereof that are present, wherein the second organic polymer is substantially devoid of polymerizable carbon-carbon unsaturation, contains less than 5% by weight of halogen, and has a weight average molecular weight of from about 25,000 to about 175,000 as measured by GPC against a polystyrene standard; and
      component 3): from 1 to 60% by weight, based on the total weight of the polymer mixture of at least one volatile compound;
   into a devolatilizing extruder while at a temperature above the boiling temperature of the at least one volatile compound;
   b) separating the heat-plasticized polymer mixture in the devolatilizing extruder into a devolatilized, heat-plasticized polymer blend containing not more than 3,000 ppm of volatile compounds and a separate vapor phase containing the at least one volatile compound; and
   c) discharging the vapor phase through at least one vent in the devolatilizing extruder barrel and discharging the devolatilized polymer blend from the devolatilizing extruder through an outlet downstream of the vent(s), wherein:
   A) the devolatilized polymer blend discharged from the extruder outlet has a melt shear viscosity at 180° C. of no greater than 500 Pa·s at a shear rate of 100 s$^{-1}$ and of no greater than 300 Pa·s at a shear rate of 1000 s$^{-1}$ as measured by capillary rheometry; and B) during steps a), b) and c), the polymer mixture and the devolatilized polymer blend are maintained at a temperature of no greater than 100° C. above the glass transition temperature of the first thermoplastic polymer.

2. The process of claim 1, wherein the devolatilizing extruder contains an extruder barrel that includes at least one internal rotating screw, an inlet for introducing the polymer mixture into the extruder barrel, at least two vents downstream of said inlet for removal of gasses from the extruder barrel, and an outlet located at one end of the extruder barrel for discharge of the devolatilized polymer blend.

3. The process of claim 2, wherein a stripping agent is introduced into the barrel of the devolatilizing extruder upstream of at least one of the vents, and the stripping agent is removed from the devolatilizing extruder through at least one of the vents.

4. The process of claim 3, wherein the stripping agent is water, air, nitrogen, argon or carbon dioxide.

5. The process of claim 2, wherein the internal rotating screw contains one or more reverse elements located upstream of at least one vent.

6. The process of claim 5, wherein a melt seal is produced upstream of at least one vent, and the pressure at each melt seal is no greater than about 1.0 MPa.

7. The process of claim 5, wherein the specific energy input is from 200 to 400 Joules per gram of the heat plasticized polymer mixture fed into the devolatilizing extruder.

8. The process of claim 1, wherein component 1) includes a thermoplastic polymer containing at least 25% by weight aliphatically bound halogen.

9. The process of claim 1, wherein component 2) has a glass transition temperature of from 80 to 180° C.

10. The process of claim 9, wherein component 2) is a polymer or copolymer of a vinyl aromatic monomer.

11. The process of claim 1, wherein the heat-plasticized polymer mixture further contains at least one thermal stabilizer.

12. The process of claim 1, wherein component 1) and at least part of component 3) are a solution of a brominated butadiene-styrene block copolymer in a solvent from a bromination reaction.

13. The process of claim 1, wherein the devolatilized polymer blend obtained from the extruder is solidified.

14. The process of claim 13, wherein the solidified polymer blend is combined with a bulk polymer and melt processed.

15. The process of claim 14 wherein the melt processing is a foaming extrusion process.

16. The process of claim 14, wherein the bulk polymer has a molecular weight of at least 200,000.

17. The process of claim 16 wherein the bulk polymer is a homopolymer of styrene or a copolymer of styrene with ethylene, propylene, acrylic acid, maleic anhydride, acrylonitrile or a mixture of any two or more thereof.

18. The process of claim 14, wherein the bulk polymer is dissolved in a monomer or monomers and the monomer or monomers is suspension polymerized to form polymer beads, the polymer beads are infused with a blowing agent to form expandable polymer beads, and the expanded polymer beads are thermally expanded to form a foamed article.

* * * * *